US008589893B1

(12) United States Patent
Allen (10) Patent No.: US 8,589,893 B1
(45) Date of Patent: Nov. 19, 2013

(54) USAGE-BASED PROGRAM SLICING

(75) Inventor: Nicholas A. Allen, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 188 days.

(21) Appl. No.: 13/069,060

(22) Filed: Mar. 22, 2011

(51) Int. Cl.
*G06F 9/44* (2006.01)

(52) U.S. Cl.
USPC ............................ 717/130; 717/128; 717/120

(58) Field of Classification Search
None
See application file for complete search history.

(56) References Cited

U.S. PATENT DOCUMENTS

| | | | |
|---|---|---|---|
| 5,579,520 A * | 11/1996 | Bennett | 717/151 |
| 6,481,008 B1 * | 11/2002 | Chaiken et al. | 717/158 |
| 6,807,548 B1 * | 10/2004 | Kemper | 1/1 |
| 7,076,764 B2 | 7/2006 | Kramer | |
| 7,237,236 B2 | 6/2007 | Kershenbaum et al. | |
| 7,370,318 B1 | 5/2008 | Howe et al. | |
| 7,451,439 B2 | 11/2008 | Nickell et al. | |
| 7,669,188 B2 | 2/2010 | Nickell et al. | |
| 7,856,626 B2 * | 12/2010 | Abernethy et al. | 717/151 |
| 2003/0046668 A1 * | 3/2003 | Bowen | 717/131 |
| 2005/0144602 A1 * | 6/2005 | Ngai et al. | 717/151 |
| 2008/0313149 A1 * | 12/2008 | Li et al. | 707/3 |
| 2009/0276412 A1 * | 11/2009 | Anderson et al. | 707/5 |
| 2010/0299305 A1 * | 11/2010 | Laxman et al. | 707/609 |
| 2010/0306754 A1 * | 12/2010 | Javed et al. | 717/152 |
| 2011/0099541 A1 * | 4/2011 | Blomstedt et al. | 717/136 |
| 2011/0302553 A1 * | 12/2011 | Gulwani | 717/107 |
| 2012/0151469 A1 * | 6/2012 | Wookey | 717/175 |

* cited by examiner

*Primary Examiner* — Don Wong
*Assistant Examiner* — Hossain Morshed
(74) *Attorney, Agent, or Firm* — Baker Botts L.L.P.

(57) ABSTRACT

In certain embodiments, execution traces for a program definition of an application are accessed. Probability information for components of the program definition is computed based at least in part upon the execution traces. Program definition slices are determined based at least in part upon the probability information. The program definition slices comprises a baseline slice and at least one supplemental slice. The baseline slice is communicated to a client in response to a request for the application. At least one supplemental slice is communicated to the client to allow the patching of the baseline slice with the at least one supplemental slice to recreate at least a portion of the program definition.

25 Claims, 4 Drawing Sheets

USAGE-BASED PROGRAM SLICING

BACKGROUND

A website may have a complex interactive web application. The application may be downloaded to a client to run inside of a web browser. In certain situations, while pages and images of the website are downloading, resources to support the application are also downloading. The downloads may compete for limited bandwidth, yielding a delayed startup time for the application and the website.

DESCRIPTION OF EXAMPLE EMBODIMENTS

A website may include a complex interactive web application. The application may be downloaded to a client to run inside of a web browser. In certain situations, while pages and images of the website are downloading, other resources to support the application are also downloading. The downloads may compete for limited bandwidth, which may result in a delayed startup time for the application and the website.

In certain situations, an application may be manually refactored in order to be modularly loaded. Manually refactoring an application may require considerable upfront planning and preparation. Moreover, if the application is changed, more manual refactoring may be needed. Accordingly, manual refactoring may be cumbersome.

Certain embodiments may provide efficient downloading of a web application. In the embodiments, a program definition of the application may be divided into program definition slices. The program definition slices may include a baseline slice and one or more supplemental slices. In some cases, the baseline slice includes mandatory program components, and a supplemental slice includes optional program components. The baseline slice may be communicated to a client in response to a request for the application. The supplemental slices may be delivered after the baseline slice, which may allow for efficient delivery of the application. Downloaded slices may be patched together to recreate at least a portion of the program definition.

Certain embodiments may obtain execution traces to determine the program definition slices. In the embodiments, an instrumented program definition of the program definition may be prepared. The instrumented program definition includes instructions for reporting execution traces and may be communicated to a client to obtain execution traces from the client.

Certain embodiments may determine the program definition slices from probability information obtained from the execution traces. In the embodiments, program definition slices that optimize a feature, such as minimize a penalty, may be selected. In certain cases, a penalty may take into account the costs of downloading program components of slices and/or dependency probabilities that the components might require execution of another component of another slice, such as a slice that might not have been downloaded. The probability may be determined from the execution traces.

Figure 1:
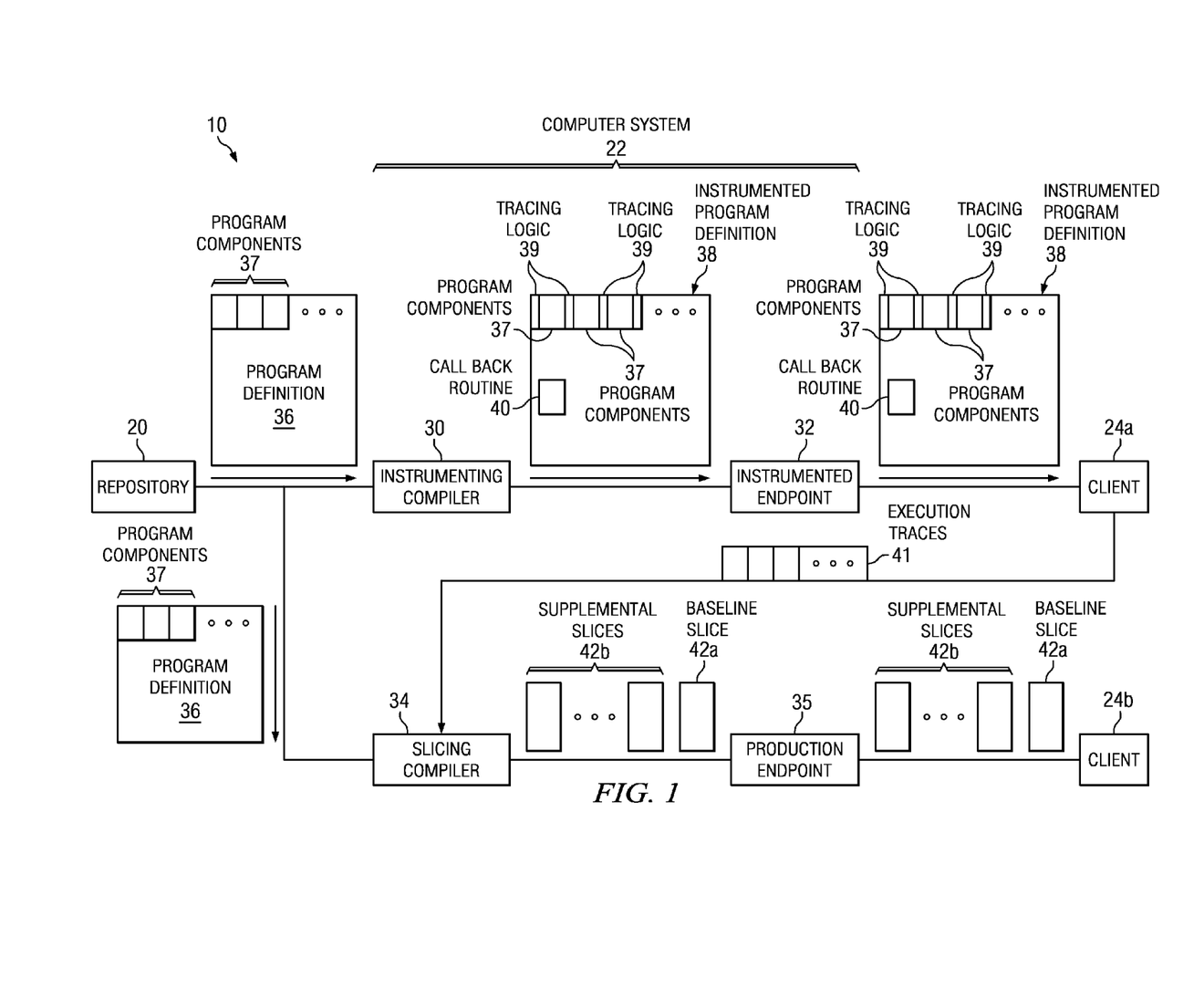
FIG. 1 illustrates an example of a system that performs usage-based program slicing.

FIG. 1 illustrates an example of a system that performs usage-based program slicing. In the illustrated example, system 10 includes a repository 20, a computer system 22, and clients 24 (e.g., 24 a,b). In certain cases, repository 20 may store program definitions 36 of applications. Computer system 22 may prepare and send an instrumented program definition 38 to client 24a in order to obtain execution traces 41 of program definition 36. Computer system 22 may then use traces 41 to divide program definition 36 into slices 42, which may be provided to client 24b to efficiently download the application.

Repository 20 may comprise one or more memories (described in more detail below) and may be a source code repository that stores program definitions 36. A program definition 36 of an application may include instructions for a computer to carry out particular tasks. A program definition 36 may have any suitable format, for example, structured binary object (such as compiled Java or .Net class) or interpretable source code (such as JavaScript). A program definition 36 may be retrieved from repository 20 or production endpoint 35. Production endpoint 35 is described in more detail below.

A program component may be any suitable portion of program definition 36, for example, a program module. Examples of program components include a function definition, a class definition, and a module definition. A function definition may be a routine that applies across applications. A class definition may be a template for an object. A module definition may define a component of a program.

Computer system 22 may include one or more computers (described in more detail below). Computer system 22 includes an instrumenting compiler 30, an instrumented endpoint 32, a slicing compiler 34, and a production endpoint 35. Instrumenting compiler 30 and/or instrumented endpoint 32 may be used to obtain execution traces 41 that indicate if and/or when program components have been executed. In certain embodiments, instrumenting compiler 30 prepares an instrumented program definition 38 that instructs a client 24a to send execution traces 41, and instrumented endpoint 32 provides instrumented program definition 38 to client 24a.

In certain embodiments, an execution trace 41 may include a component identifier, timing information, and/or a client identifier. A component identifier identifies a program component, and may be used to identify a component that is executed. A component identifier may be determined from a label that is inserted at a point (such as an entry or exit point) of the component. Timing information indicates the time of a state change, such as the time when a component was executed. In certain embodiments, the timing information indicates an elapsed time between the start of the execution of program definition 38 to the time when a component was executed. Timing information may be expressed in any suitable manner. For example, the timing information may be given as two timestamps from which the elapsed time can be calculated, such as an initial timestamp of the start of the execution of program definition 38 and a subsequent timestamp of the time when a component was executed. As another example, the timing information may be given as a stopwatch time that provides the elapsed time. Client identifier identifies client 24a that provides execution traces 41. Computer system 22 may use an identifier (such as a client or session identifier) to correlate execution traces 41 of client 24a to a single instance.

Instrumenting compiler 30 may prepare instrumented program definition 38 in any suitable manner. In certain embodiments, instrumenting compiler 30 determines points (such as entry and exit points) of program components where tracing logic 39 can be inserted. A point may indicate any suitable part of a program component. For example, an entry point may indicate the start of the program component, and an exit point may indicate the end of the program component. In certain embodiments, entry and exit points may represent synchronous transitions (such as a direct function call) and/or asynchronous transitions (such as an asynchronous callback or continuation).

Points may be determined by, for example, parsing program definition 36. For example, instrumenting compiler 30 may parse a JavaScript program definition to find globally named functions and/or anonymous lambda functions defined inline. As another example, instrumenting compiler 30 may inspect text strings of the program definition 36 to identify and parse functions that may be dynamically evaluated.

Tracing logic 39 inserted at a point of a component may initiate reporting of execution of the component when the component is executed. Tracing logic 39 may include a library function that creates execution trace 41. In certain embodiments, tracing logic 39 for asynchronous transitions may capture the invocation call stack to trace execution paths that are discontinuous in time. The call stack may be captured when the asynchronous callback is established, and the call may be wrapped to restore the call stack prior to resuming execution.

In certain embodiments, instrumenting compiler 30 may insert labels identifying the program components at the points, which may allow the tracing logic 39 to report the particular program component that is executed. Any suitable label may be used. For example, the label may be based on a module and/or function name, or may be dynamically generated.

In certain embodiments, instrumenting compiler 30 may insert a callback routine 40 into instrumented program definition 38. Callback routine 40 instructs client 24a to submit execution traces 41 to computer system 22. For example, an asynchronous callback routine 40 may execute subsequent to the loading of program definition 38. The asynchronous callback routine 40 may establish an Hypertext Transfer Protocol (HTTP) connection to computer system 22. The connection may be used to post the execution traces 41 back to computer system 22.

Callback routine 40 may report execution traces 41 back to computer system 22 in any suitable manner. For example, traces 41 may be sent after obtaining a certain time interval of traces 41. An another example, execution traces 41 may piggyback existing application messages. Program definition 38 may wait for the next application call after execution traces 41 are ready and attach traces 41 to the application responses.

Instrumented endpoint 32 delivers instrumented program definition 38 to client 24a to allow client 24a to report execution traces 41 to computer system 22, such as to end point 32. Instrumented endpoint 32 may be hosted by a server (such as an HTTP server) to deliver instrumented program definition 38 to client 24a.

Computer system 22 may store execution traces 41 as annotations, such as imbedded comments, in the source code file of program definition 36 or in a separate location such as a database. Computer system 22 may select certain execution traces 41 to provide to slicing compiler 34. Any suitable selection criteria may be used, for example, the recentness and/or the source code version of traces 41.

Slicing compiler 34 and/or production endpoint 35 provide program definition slices 42 to client 24b that allows client 24b to recreate at least a portion of program definition 36. In certain embodiments, slicing compiler 34 may slice program definition 36 to yield program definition slices 42, and production endpoint 35 may provide slices 42 to client 24b.

A program definition slice 42 may include a subset (such as a proper subset) of the set of components (or modules) of a program. In certain embodiments, a complete set of program definition slices 42 may include some or all (and in some cases only) the components of program definition 36. In certain cases, slices 42 of a complete set may be pairwise distinct, but not so in other cases. In certain cases, program definition slices 42 comprises a baseline slice 42a and at least one supplemental slice 42b. Baseline slice 42a may comprise one or more mandatory components, and a supplemental slice 42b may comprise one or more optional components. A mandatory component may be required to be loaded for the application, and an optional component may not be required.

Slicing compiler 34 may slice program definition 36 to yield program definition slices 42 in any suitable manner. In certain embodiments, slicing compiler 34 may select program definition slices 42 that optimize a feature, such as minimize a penalty. In certain cases, a penalty may take into account costs of downloading program components of slices 42 and/or dependency probabilities that execution of the components leads to execution of another component in another slice 42, such as a slice 42 that might not have been downloaded. In certain embodiments, slicing compiler 34 may determine the cost from the size of the component and the dependency probability from execution traces 41.

In certain embodiments, slicing compiler 34 may use probability information comprising size information and dependency information. The size information for a component may indicate the size of the component ("component size"), expressed in units of digital information, such as bits of bytes (for example, kilobytes (KB). The dependency information for a component may indicate the probability that execution of a first component leads to execution of a second component, which may be determined from execution traces 41. The probability may be for a particular time interval, for example, the probability that the second component is executed within a time interval starting from execution of program definition 36. Any suitable time interval may be used. The time interval may be selected according to the total time it takes to download program definition 36, for example, an interval with a value in any of the following ranges 1 to 2, 2 to 3, 3 to 4, or greater than 4 seconds.

The probability information may be expressed in any suitable manner. For example, the probability information may be expressed as a probability graph that comprises nodes and edges. The nodes may represent the components and may have a value indicating the size of the components. An edge from a first node to a second node may represent the probability of going from the first node to the second node. The edge may have an edge weight that indicates the probability that the second node is reached from the first node. A probability graph is discussed in more detail with reference to FIGS. 5A through 5C.

Program definition slices 42 may be determined in any suitable manner from a probability graph. In certain embodiments, slices 42 may be determined by optimizing a weighted sum of the dependency information and the size information. An example of optimizing a weighted sum is discussed in more detail with reference to FIGS. 5A through 5C.

Slicing compiler 34 may prepare slices 42 to allow client 24b to patch slices 42. In certain embodiments, a slice 42 may include a function stub for a function definition of another slice 42. For example, a function stub may be a function pointer pointing to the location of the program loader with the requested function. The function stub may invoke the program loader, which patches the function definition of the supplemental slice 42b into the slice 42 with the function stub. In certain embodiments, the program loader requests the slice 42 containing the function definition. Any suitable request may be used, for example, an asynchronous HTTP request, which allows other portions of the program to continue execution, or asynchronous HTTP request, which blocks execution until the supplemental slice 42b has loaded. The program loader extracts the function definition from slice 42 and creates an invocable function in memory. The program loader then assigns the function pointer of the function stub to point to the function stored in memory. The program loader may invoke the function pointer with the same call stack and parameters used with the function stub.

Production endpoint 35 may provide slices 42 to client 24b in any suitable manner. In certain embodiments, production endpoint 35 may communicate baseline slice 42a to client 24b in response to a request for the application or other request from client 24b. Production endpoint 35 may communicate a supplemental slice 42b in response to the operation of a program loader of a baseline slice 42a or independent of any request for slice 42b. In certain embodiments, a second slice 42 may be downloaded before or after a first slice 42 has completed downloading. For example, if there is available bandwidth a second slice 42 may be downloaded before a first slice 42 has finished. Production endpoint 35 may be hosted by a server (such as an HTTP server) to deliver slices 42 to client 24b.

A client 24 may include one or more computers. Clients 24 may include one or more reporting clients 24a and/or one or more receiving clients 24b. A reporting client 24a reports execution traces 41 to computer system 22, and a receiving client 24b receives program definition slices 42 from computer system 22. A reporting client 24a may be the same as or different from a receiving client 24b.

Figure 2:
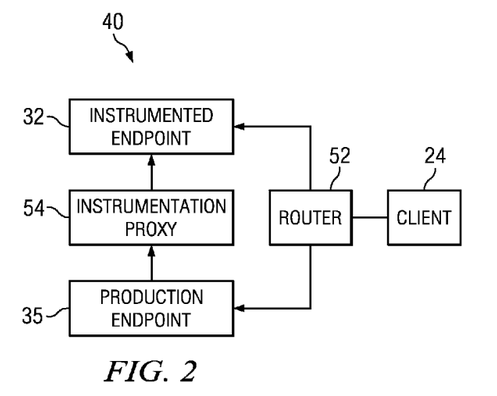
FIG. 2 illustrates another example of a system that performs usage based program slicing.

FIG. 2 illustrates another example of a system 40 that performs usage-based program slicing. In the illustrated example, system 40 includes instrumented endpoint 32, production endpoint 35, client 24, and instrumentation proxy 54, and a router 52.

Router 52 uses a routing configuration to direct traffic between endpoints 32 and 35. For example, the routing configuration may instruct router 52 to direct X percent of traffic to instrumented endpoint 32 and Y percent of traffic to production endpoint 35. As another example, the routing configuration may direct traffic to a particular endpoint 32 or 35 with respect to geographic location of client 24, time interval since the last sample execution path, identity of the user, or other factors. In other embodiments, instrumented endpoint 32 may be accessed in a different manner than production endpoint 35. For example, instrumented endpoint 32 may receive requests at a different URL than that of production endpoint 35.

In certain embodiments, production endpoint 35 may be used to obtain program source code rather than using a repository 20. Instrumenting compiler 30 may be implemented as a proxy server 54 that retrieves source code through production endpoint 35. Instrumentation proxy 54 may then transform the program definition to the instrumented program definition as discussed. In the embodiments, original source code from a repository 20 is not used, and system 40 may be used to analyze a program definition of a third-party website.

Figure 3:
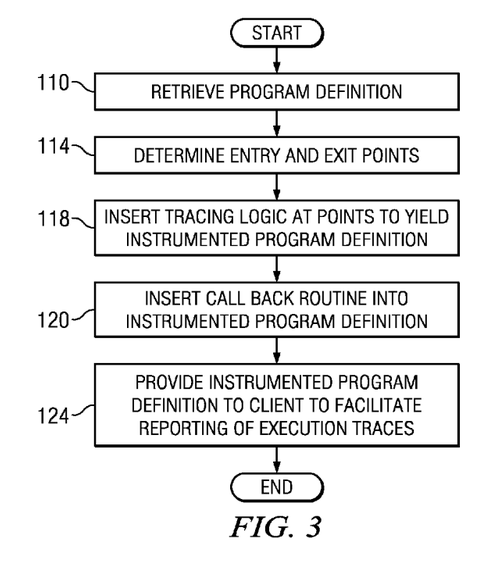
FIG. 3 illustrates an example of a method for preparing an instrumented program definition.

FIG. 3 illustrates an example of a method for preparing an instrumented program definition. The method may be performed by one or more components of computer system 22, for example, instrumenting compiler 30 and/or instrumented endpoint 32.

The method begins at step 110, where the program definition is retrieved. The program definition may be retrieved from repository 20 or from production endpoint 35. Exit and entry points are determined at step 114. The exit and entry points may indicate starting and ending points of components of the program definition, and may be determined by parsing the program definition.

Tracing logic is inserted at the points to yield an instrumented program definition at step 118. The tracing logic may be used to initiate traces of program components that have been executed. A callback routine is inserted into the program definition at step 120. The callback routine may be used to send the execution traces back to computer system 22. The instrumented program definition is provided to client 24a at step 124 to facilitate reporting of execution traces. The instrumented program definition instructs client 24a to report execution traces to computer system 22. The method then ends.

Figure 4:
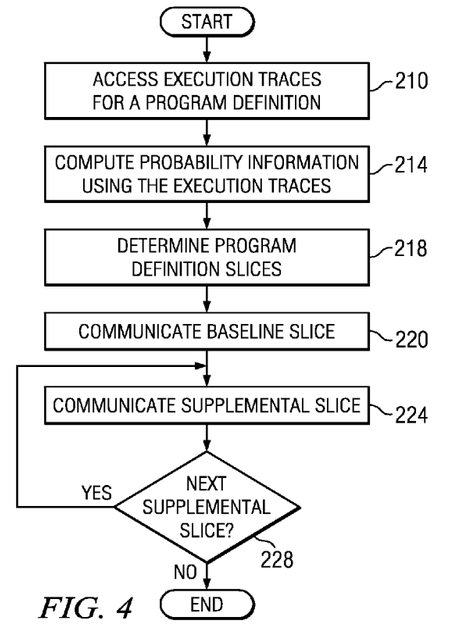
FIG. 4 illustrates an example of a method for determining program definition slices.

FIG. 4 illustrates an example of a method for determining program definition slices. The method may be performed by one or more components of computer system 22, for example, slicing compiler 34 and/or production endpoint 35.

The method begins at step 210, where execution traces for a program definition are accessed. The execution traces may indicate if and/or when particular program components of the program definition are executed. Probability information is computed using the execution traces at step 214. The probability information may include the size of the component and the dependency probability that execution of one component leads to execution of another component of another slice, such as a slice that might not have been downloaded.

Program definition slices are determined from the probability information at step 218. The program definition slices include baseline and one or more supplemental slices. The program definition slices may be determined by solving an optimization problem using the probability information. For example, the penalty of each candidate slice may be calculated using the sizes and the dependency probabilities of the components of the candidate slice. The optimization problem may seek slices that minimize the penalty.

The baseline slice is communicated at 220. The baseline slice may include mandatory components that may be required for execution of the program definition A supplemental slice is communicated at step 224. A supplemental slice may include optional components that may not be required for execution of the program definition. There may be a next supplemental slice at step 228. If there is a next supplemental slice, the method returns to step 224 to communicate the next supplemental slice. If there is no next supplemental slice, the method ends.

Figure 5A:
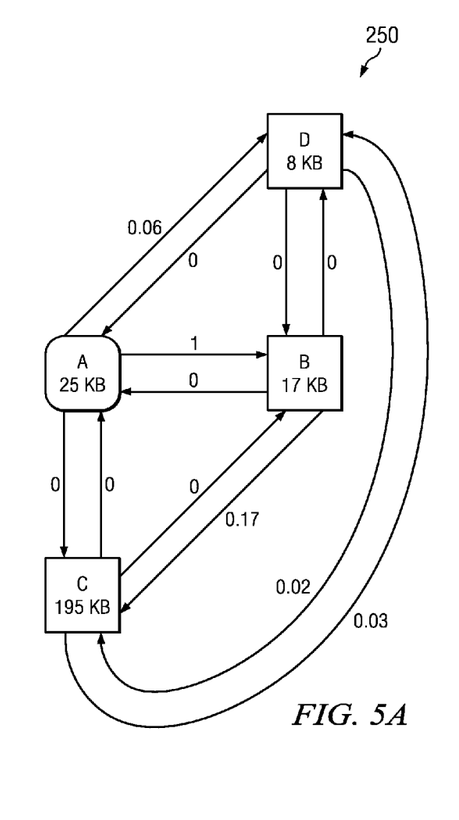
FIGS. 5A through 5C illustrate an example of a method for optimizing to determine program definition slices.
Figure 5B:
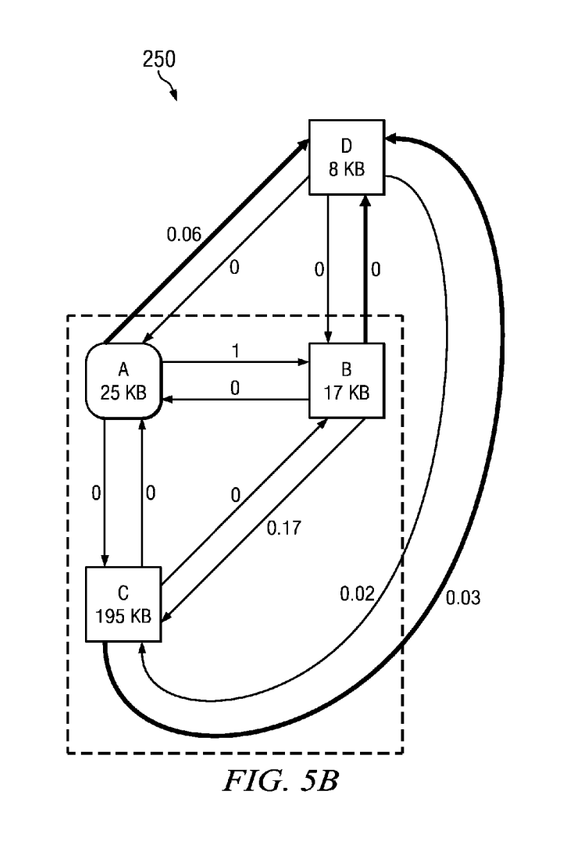
Figure 5C:
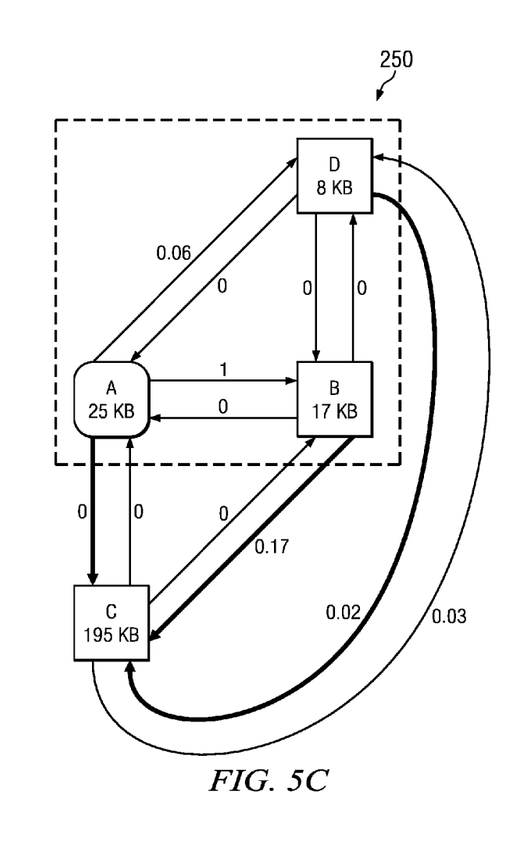

FIGS. 5A through 5C illustrate an example of a method for optimizing to determine program definition slices. FIG. 5A illustrates a probability graph 250 with nodes and edges. The nodes represent program modules (or components) A through D. A node has a node weight that gives the size of the modules, expressed in kilobytes (KB). An edge from a first node (representing a first module) to a second node (representing a second module) represents the probability that execution of the first module leads to execution of the second module. An edge has an edge weight that gives the probability.

Slicing compiler 34 determines a partitioning scheme that includes sets of modules, which may be used as program definition slices. In the example, a slice P is a set of the modules. In the example, module A is the entry point, and two candidate partitioning schemes with candidate slices are considered: partitioning scheme 1, which has a candidate baseline slice $P_1$ with modules A, B, and C, and partitioning scheme 2, which has a candidate baseline slice $P_2$ with modules A, B, and D.

Slicing compiler 34 may determine the partitioning scheme by solving an optimization problem. An optimization problem involves maximizing or minimizing an objective function. In certain embodiments, slicing compiler 34 may optimize by minimizing a penalty. In some cases, a penalty may take into account a cost of downloading modules of a slice and/or a dependency probability that the modules require execution of another module in another slice that might not have been downloaded. For example, a penalty for a partitioning scheme may take into account the sizes of the slices of the partitioning scheme (the "slice sizes") and/or the dependency probabilities of the slices of the partitioning scheme (the "slice dependencies"). A slice size may indicate the size of a slice and may be determined from the sizes of the modules of the slice. A slice dependency may indicate the dependency of a slice on another slice and may be determined from the dependency probabilities of the modules of the slice.

In certain embodiments, a penalty function for a slice may be a mathematical function of the sizes of the nodes in the slice (which represents the slice size) and/or the edge weights of the edges from modules inside of the slice to modules outside of the slice (which represents the slice dependency). In certain cases, the function may be a sum, such as a weighted sum, of the node sizes and edge weights. As an example, a penalty function for a partition P may be expressed as the following equation:

$$O(P) = \sum_{X \in P} \omega_1 * S(X) + \sum_{X \in P, Y \in \overline{P}} \omega_2 * E(X, Y)$$

In the example, S(X) is the size of a module or partition X, E(X,Y) is the edge weight from module X to module Y, $\omega_1$ is the size weight factor, and $\omega_2$ is the edge weight factor. In the example, $\omega_1$ equals 1 and $\omega_2$ equals 1000.

Size weight factor $\omega_1$ and edge weight factor $\omega_2$ may be used to normalize the size and edge weight with respect to each other and/or to indicate the relative importance of the size and edge weight with respect to each other. Any suitable weights may be used. In certain embodiments, the weights may be determined according to the rate of downloading components.

FIG. 5B illustrates partition $P_1$. The penalty $O(P_1)$ is:

$$O(P_1) = \omega_1 * [S(A) + S(B) + S(C)] + \omega_2 * [E(A, D) +$$
$$E(B, D) + E(C, D)]$$
$$= 1 * [25 + 17 + 195] + 1000 * [0.06 + 0 + 0.03]$$
$$= 327$$

FIG. 5C illustrates partition $P_2$. The penalty $O(P_2)$ is:

$$O(P_2) = \omega_1 * [S(A) + S(B) + S(D)] + \omega_2 * [E(A, C) +$$

-continued
$$E(B, C) + E(D, C)]$$
$$= 1 * [25 + 17 + 8] + 1000 * [0 + 0.17 + 0.02]$$
$$= 240$$

Partition $P_2$ has a lower penalty, so partition 2 is selected.

In certain embodiments, a penalty function may take into account the cost of downloading a supplemental slice. For example, a penalty function may be expressed as the following equation:

$$O(P) = \sum_{X \in P} \omega_1 * S(X) + \sum_{X \in P, Y \in \overline{P}} \omega_2 * [E(X, Y) * (Q + S(\overline{P}))]$$

where weight Q indicates the cost of downloading a supplemental slice.

In certain embodiments, a penalty function may take into account that there is no penalty for reusing a module that has already been downloaded. In the embodiments, E'(X,Y) may be a diminished edge weight from module X to module Y that reduces the penalty for reusing a downloaded module Y. Diminished edge weight E'(X,Y) takes into account the probability D(Y) that module Y has not been downloaded, and may be calculated according to the following equation:

$$E'(X,Y) = E(X,Y) \times D(Y)$$

For example, diminished edge weight E'(C,D) may be 0.018.

In certain embodiments, a partitioning scheme may include more than two slices, such as a baseline slice and two or more supplemental slices. The slices may be determined in any suitable manner. As an example, in a first iteration, optimization may be performed on the modules of the program definition (which may be regarded as an "initial slice") to yield two slices, such as a baseline slice and a remaining slice. In a second iteration, optimization may be performed on the remaining slice to yield two more slices, such as a first supplemental slice and a next remaining slice. In a third iteration, optimization may be performed on the next remaining slice to yield two more slices, such as a second supplemental slice and a next remaining slice, and so on. The number of iterations may be selected according to the desired number of slices.

As another example, candidate partitioning schemes that each include a predetermined number of three or more slices (such as a baseline slice and two or more supplemental slices) may be optimized. A penalty of a partitioning scheme may be calculated by applying a mathematical function to the penalties of the slices of the scheme. For example, the penalty of the scheme may be the sum (such as the weighted sum) of the penalties of the slices. In certain embodiments, the penalty of a earlier downloaded slice (such as a baseline slice) may be weighted more heavily than the penalty of a later downloaded slice (such as a supplemental slice).

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component (such as a computer) of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
one or more memory units operable to:
store an instrumented program definition of an application, the instrumented program definition comprising tracing logic at one or more entry or exit points of a plurality of program components of the program definition;
one or more processing units operable to:
communicate the instrumented program definition over a network to a first client that is remote from the one or more processing units to obtain a plurality of execution traces by executing the instrumented program definition at the first client;
determine a plurality of program definition slices based at least in part upon the plurality of execution traces, the program definition slices comprising a baseline slice and one or more supplemental slices;
communicate the baseline slice over the network to a second client that is remote from the one or more processing units in response to a request for the application; and
communicate at least one supplemental slice over the network to the second client to allow the patching of the baseline slice with the at least one supplemental slice to recreate at least a portion of the program definition.

2. The system of claim 1, the one or more processing units operable to prepare the instrumented program definition by:
parsing the program definition to identify the one or more entry or exit points; and
inserting the tracing logic at the one or more entry or exit points.

3. The system of claim 1, the one or more processing units operable to prepare the instrumented program definition by inserting a callback routine into the program definition.

4. The system of claim 1, the one or more processing units operable to determine the plurality of program definition slices based at least in part upon the plurality of execution traces by:
partitioning the program definition to yield a plurality of candidate partitioning schemes, each candidate partitioning scheme comprising a set of candidate program definition slices; and
identifying a candidate partitioning scheme that minimizes a penalty for downloading a set of candidate program definition slices.

5. The system of claim 1, the one or more processing units operable to determine the plurality of program definition slices based at least in part upon the plurality of execution traces by:
determining a plurality of dependency probabilities from the plurality of execution traces, a dependency probability indicating a probability that execution of a first component of a first slice leads to execution of a second component of a second slice; and
determining the plurality of program definition slices based at least in part upon the plurality of dependency probabilities.

6. The system of claim 1, the one or more processing units operable to determine the plurality of program definition slices based at least in part upon the plurality of execution traces by:
determining a plurality of component sizes for the plurality of program components; and
determining the plurality of program definition slices based at least in part upon the plurality of component sizes.

7. The system of claim 1, the one or more processing units operable to determine the plurality of program definition slices based at least in part upon the plurality of execution traces by:

generating a plurality of candidate partitioning schemes from the program definition, each candidate partitioning scheme comprising a set of candidate program definition slices;

performing the following for a candidate program definition slice of each candidate partitioning scheme:

determining a slice dependency for the candidate program definition slice, the slice dependency indicating a dependency of the candidate program definition slice on another candidate program definition slice; and determining a slice size for the candidate program definition slice, the slice size indicating the size of the candidate program definition slice; and calculating a penalty of the candidate program definition slice from the slice dependency and the slice size.

8. The system of claim 1, the one or more processing units operable to determine the plurality of program definition slices based at least in part upon the plurality of execution traces by performing the following for at least two iterations:

partitioning a current program definition slice to yield a candidate slice and a remaining slice;

selecting the candidate slice for a partitioning scheme;

setting the remaining slice as the current program definition slice.

9. The system of claim 1, the one or more processing units operable to determine the plurality of program definition slices based at least in part upon the plurality of execution traces by:

calculating a penalty of a candidate partitioning scheme comprising a set of three or more candidate program definition slices by:

calculating a first penalty of a first candidate program definition slice and a second penalty of a first candidate program definition slice; and determining a weighted sum of the first penalty and the second penalty.

10. A computer-implemented method comprising:

accessing, by one or more processing units, a plurality of execution traces for a program definition of an application;

computing, by the one or more processing units, probability information for a plurality of program components of the program definition based at least in part upon the plurality of execution traces;

determining, by the one or more processing units, a plurality of program definition slices based at least in part upon the probability information, the program definition slices comprising a baseline slice and one or more supplemental slices;

communicating, by the one or more processing units, the baseline slice over a network to a client that is remote from the one or more processing units in response to a request for the application; and communicating, by the one or more processing units, at least one supplemental slice over the network to the client to allow the patching of the baseline slice with the at least one supplemental slice to recreate at least a portion of the program definition.

11. The method of claim 10, further comprising preparing an instrumented program definition of the program definition by:

parsing the program definition to determine one or more entry or exit points of the plurality of program components; and inserting tracing logic at the one or more entry or exit points.

12. The method of claim 10, the program components comprising:

a function definition;

a class definition; or a module definition.

13. The method of claim 10, further comprising retrieving the program definition from one of a source code repository or a production endpoint.

14. The method of claim 10, further comprising obtaining the plurality of execution traces by:

inserting tracing logic at one or more entry or exit points of the plurality of program components to yield an instrumented program definition of the program definition; and facilitating execution of the instrumented program definition at a second client to generate at least one of the plurality of execution traces.

15. The method of claim 10, further comprising obtaining the plurality of execution traces by:

inserting a callback routine into the program definition; and facilitating execution of the callback routine at the client to communicate at least one of the plurality of execution traces.

16. The method of claim 10, the probability information comprising:

dependency information for the plurality of program components of the program definition; and size information for the plurality of program components of the program definition.

17. The method of claim 16, the dependency information for a particular program component of a program definition slice representing the probability that execution of the particular program component leads to execution of another program component of another program definition slice.

18. The method of claim 10, the determining the plurality of program definition slices based at least in part upon the probability information further comprising:

accessing size information and dependency information of the probability information; and optimizing a weighted sum of the size information and the dependency information.

19. The method of claim 10, further comprising:

serving an instrumented program definition of the program definition to a second client for execution; and receiving at least one of the plurality of execution traces from a server coupled to the second client.

20. The method of claim 10, the communicating the at least one supplemental slice to the client further comprising:

communicating the at least one supplemental slice in response to operation of a program loader of the baseline slice.

21. The method of claim 10, the baseline slice comprising one or more mandatory components of the program definition.

22. The method of claim 10, a supplemental slice comprising one or more optional components of the program definition.

23. One or more non-transitory computer-readable media comprising logic, the logic when executed by one or more processing units operable to perform operations comprising:

prepare an instrumented program definition of a program definition of an application, the instrumented program definition comprising instructions for reporting a plurality of execution traces;

communicate the instrumented program definition over a network to a first client that is remote from the one or more processing units to obtain the plurality of execution traces by executing the instrumented the first client;

determine a plurality of program definition slices based at least in part upon the plurality of execution traces, the program definition slices comprising a baseline slice and one or more supplemental slices;

communicate the baseline slice over the network to a second client that is remote from the one or more processing units in response to a request for the application; and communicate at least one supplemental slice over the network to the second client to allow the patching of the baseline slice with the at least one supplemental slice to recreate at least a portion of the program definition.

24. The media of claim 23, the instrumented program definition comprising tracing logic at one or more entry or exit points of a plurality of program components of the program definition.

25. The media of claim 23, the determining the plurality of program definition slices based at least in part upon the plurality of execution traces further comprising:

computing probability information for a plurality of program components based at least in part upon the plurality of execution traces; and determining the plurality of program definition slices based at least in part upon the probability information.

* * * * *